United States Patent [19]

Colvocoresses

[11] Patent Number: 4,765,564
[45] Date of Patent: Aug. 23, 1988

[54] SOLID STATE APPARATUS FOR IMAGING WITH IMPROVED RESOLUTION

[75] Inventor: Alden P. Colvocoresses, Fairfax, Va.

[73] Assignee: The United States of America as represented by the Secretary of the Interior, Washington, D.C.

[21] Appl. No.: 718,975

[22] Filed: Apr. 2, 1985

[51] Int. Cl.$^4$ .......................... F41G 7/00; H04N 3/14; H04N 5/335
[52] U.S. Cl. .................................. 244/3.16; 250/578; 358/213.28
[58] Field of Search ............................ 244/3.16, 3.17; 250/578, 226; 356/398; 358/213.27, 213.28, 285, 293

[56] References Cited

U.S. PATENT DOCUMENTS

| | | | |
|---|---|---|---|
| 4,314,761 | 2/1982 | Reymond et al. | 244/3.16 |
| 4,465,940 | 8/1984 | Graff et al. | 244/3.16 |
| 4,539,598 | 9/1985 | Dietrich et al. | 250/578 |
| 4,555,733 | 11/1985 | Garcia | 250/578 |

Primary Examiner—Charles T. Jordan
Attorney, Agent, or Firm—E. Philip Koltos

[57] ABSTRACT

A solid state apparatus for imaging with improved resolution, wherein there can be present at least two solid state sets of detector elements each set of which is sensitive to a different wave length of electromagnetic energy from the other. Each detector is situated such that it may record a picture element which is systematically offset from and partially overlaps the picture elements recorded by the analogous detectors of the other sets. There are existing computer programs for changing the data obtained into a form suitable for an image of better resolution than is possible when the analogous detectors record the same picture element of the scene without offset.

13 Claims, 7 Drawing Sheets

CONVENTIONAL LINEAR ARRAY MODE

LINEAR ARRAY IMAGING MODE

TEST AREA CONSISTING OF A SIMPLE BOUNDARY BETWEEN
TWO FIELDS OF DIFFERENT SPECTRAL RESPONSES

CONVENTIONAL MULTISPECTRAL
TWO-DIMENSIONAL ARRAY
3 BANDS REGISTERED

SYSTEMATIC OFFSET TWO-DIMENSIONAL ARRAY
3 BANDS OFFSET

BAND - 1 ———
BAND - 2 — — —
BAND - 3 ·············

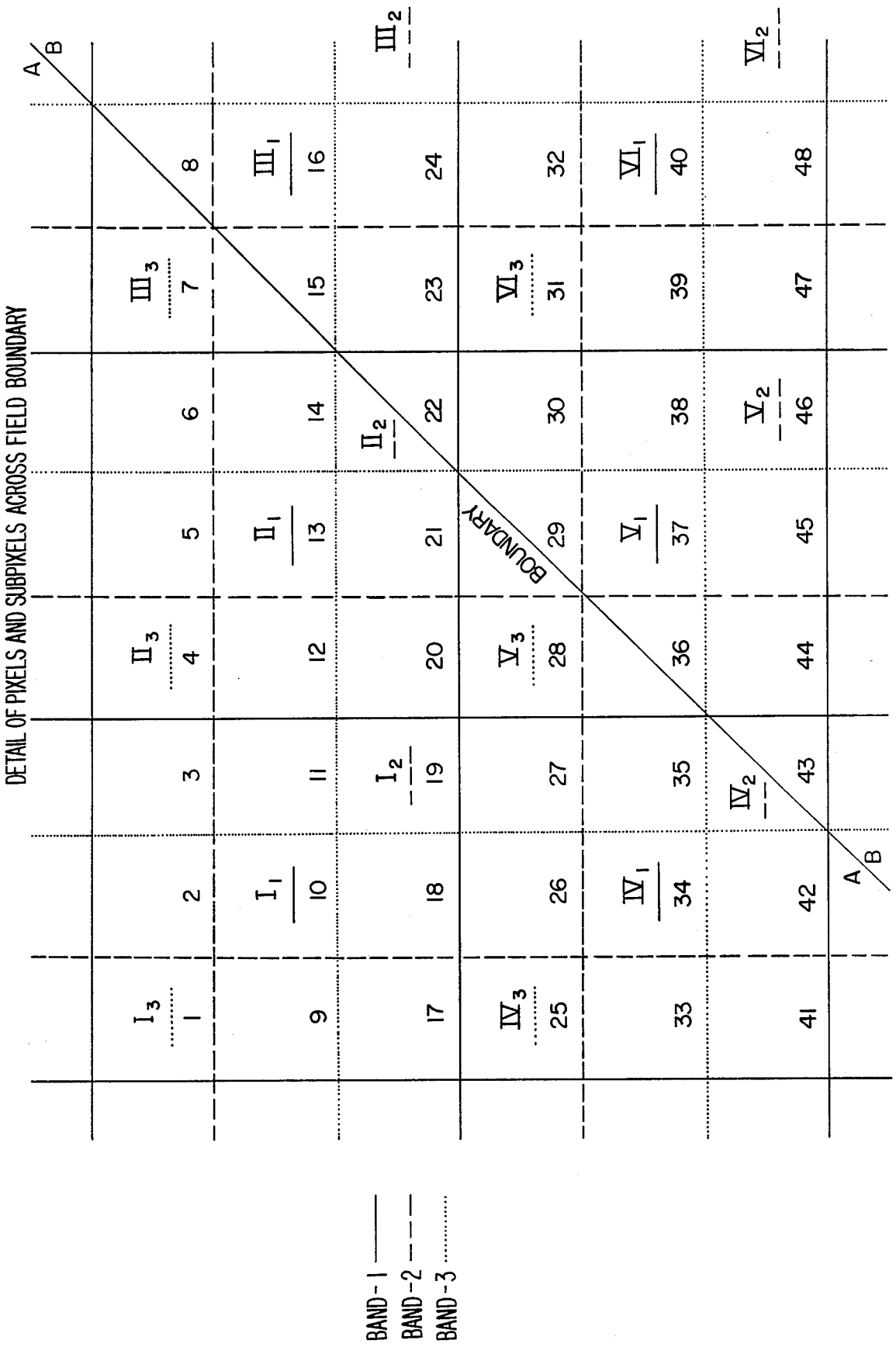

BAND 2 RESPONSE

LITTLE OR NO RELATIVE MOTION BETWEEN OBJECT
AND OFFSET DETECTOR ELEMENTS

RELATIVE MOTION BETWEEN OBJECT AND OFFSET DETECTOR ELEMENTS

SOLID STATE APPARATUS FOR IMAGING WITH IMPROVED RESOLUTION

BACKGROUND OF INVENTION

In the past, images (pictures) were taken with cameras utilizing film. In recent years, pictures have also been made by using solid state detectors which are electrically sensitive to various wave bands of energy received through an optical system. The electrical charge from each detector becomes an electronic signal which is eventually changed into the picture element (pixel) of an image. Existing solid state imaging systems which record more than one wave band, depend on the registration of the analogous picture elements of the different wave bands to record and integrate the response from the different wave bands. Such an apparatus is known as a multispectral remote sensor.

Such solid state systems have found wide use in airplane, satellite and space vehicle imaging because the data can be recorded in digital form and transmitted via wireless in near real time.

It is necessary to define several terms:

Detector refers to the smallest solid state element in the apparatus for sensing a particular wave length of electromagnetic energy arriving from the scene. The detector response in turn is processed into an electronic signal which is known as the picture element (pixel) of the resulting image.

Registration is the ability of the solid state image apparatus to merge different sets of electromagnetic energy that is sensed by the detector elements, to form a clear picture.

Resolution is a measure of the information (fineness of detail) that can be displayed in the resulting image.

Systematic offset, as used herein, means that each detector element of a given array of detectors records a signal from the scene which is offset from a signal recorded by an analagous detector in the two cartesian (cardinal) directions by a fractional amount the denominator of which is equal to the number of wave bands utilized. For example, if three wave bands are utilized (one for each array of detectors) the offset will be one third of a detector element which results in a number of subpicture elements equal to the square of the number of wave bands, in this case nine.

As stated, there were many attempts to improve resolution of such solid state imaging apparatus. But there has not been much of an attempt to improve resolution by the multiple use of the same size picture element in a given apparatus. The two exceptions that are noted is, for instance, the solid state camera that was recently developed by RCA which utilizes two green bands in which the detectors are offset to each other. As is known, the resolution in color television transmission has been improved by making one color band of higher resolution then the other two. As a result, this band improves the resolution of the picture. This principal is utilized in the RCA camera as well as the offsetting of the two green electromagnetic bands so as to form some subpicture elements or subpixels. However, this principal in the RCA camera is utilized with only one wave band and as such is of limited utility as compared to the instant invention.

Another solid state imaging apparatus that partially utilizes the concept of overlapping pixels is the multispectral sensor system (MSS) of NASA. This system utilized overlap of the picture elements of the same wave band in one direction. The images are focused by an optical system using a mechanical scanner. However, the overlap is done only in the direction perpendicular to the direction of movement of the satellite and the overlap involves the same wave bands. Accordingly, the resolution of the images could be improved further by utilizing the principal of the instant invention. Further, picture elements have been made smaller and smaller so that there could be more of these picture elements in a given image so as to improve the image resolution but this is a relatively costly way to improve resolution. Nevertheless, it has been found that with the same size of picture elements, the resolution of the picture can be improved markedly by using the principals of the instant invention.

Accordingly, it is the object of the present invention to improve the resolution of multispectral images formed by picture elements of a given size and system cost.

The object of the invention is accomplished by means of apparatus and method set forth in the Figures, and in the information set forth herein below.

BRIEF DESCRIPTION OF THE DRAWINGS

FIG. 5 is an illustration for the Example.

SUMMARY OF THE INVENTION

There is provided by the present invention a solid state apparatus for taking images with improved resolution comprising (a) at least two solid state detector arrays each of which is sensitive to a different wave length of electromagnetic energy from the other in which the analogous detector elements are situated such that they are partially offset from each other so as to form subpicture elements sensitive to the different wave lengths, and (b) a computer program or algorithm (state-of-the-art) that will process the recorded data so that more information (higher resolution) is available than is possible were the analogous detectors of the different sets positioned so as to record the same area of the scene.

DESCRIPTION OF THE PREFERRED EMBODIMENT

Figure 2A:
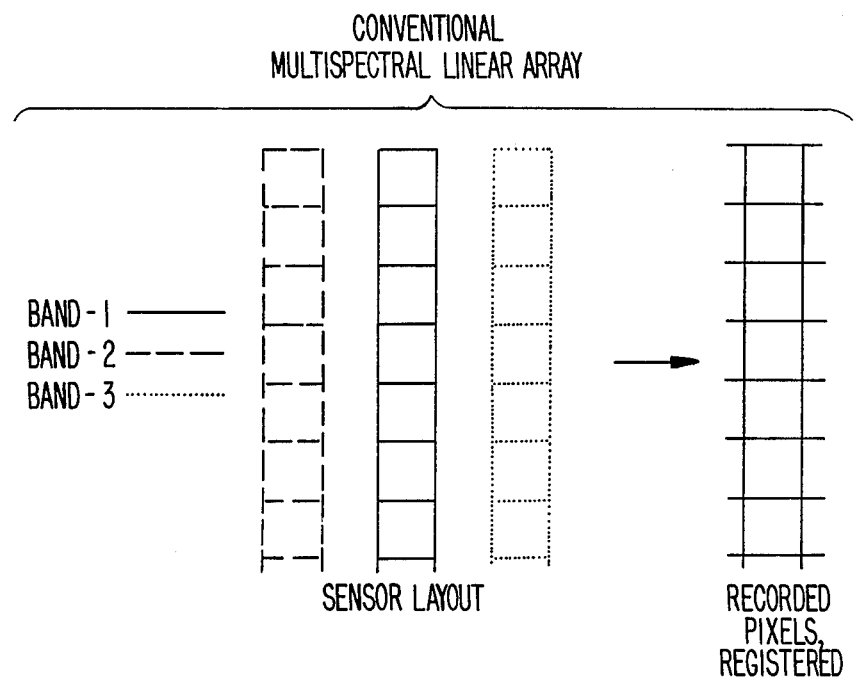
FIGS. 2(a) and 2(b) are comparison of conventional 2(a) and systematic offset 2(b) of solid state linear array images.
Figure 2B:
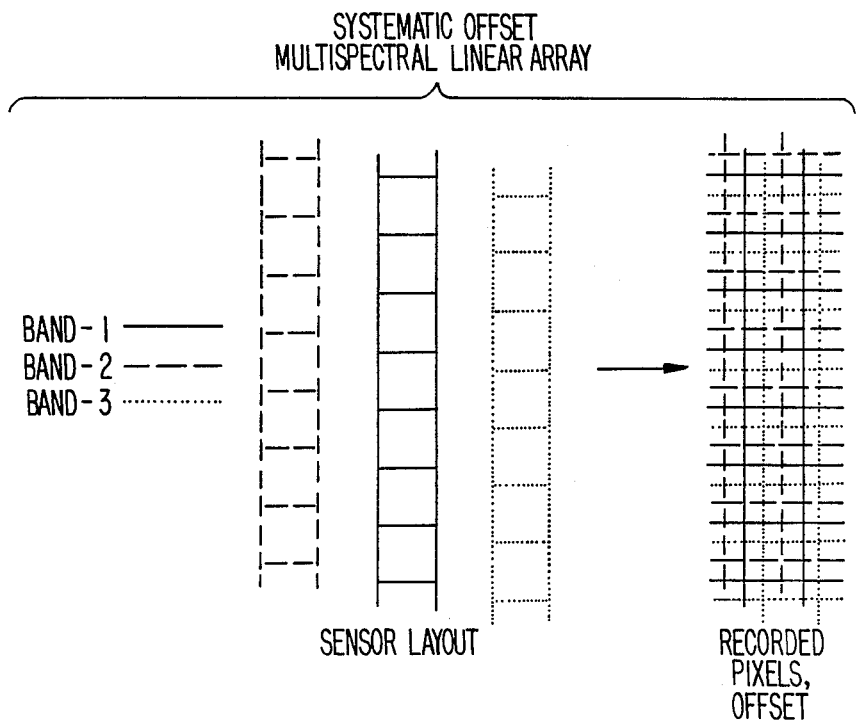

The basic function of the instant invention is to improve the resolution of a solid state multispectral images by having at least two detector arrays of different wave lengths of electromagnetic energy which are offset so that they partially overlap each other so as to create a number of subpixels in each picture element. It can be appreciated that the present invention can be utilized with electromagntic energy of different wave bands, and it does not have to be visible light. The figures are set forth in the visible light color bands of blue, green, and red which are most commonly used for display in such systems. Furthermore, there may not be three wave bands, there may be four or more bands, and there may be as few as two bands. FIG. 2b, shows how the wave bands may be offset from each other in one direction where, if they are located in a moving object in the atmosphere or space, the recorded picture element can be offset as indicated in FIG. 2b. FIG. 2a indicates the recorded pixels when conventionally registered pixels are not offset with respect to each other. In other words, in FIG. 2b, the offset is in the direction perpendicular to the movement of the object such that the picture element offset shown is formed by the movement such as from an airplane or satellite.

Figure 1:
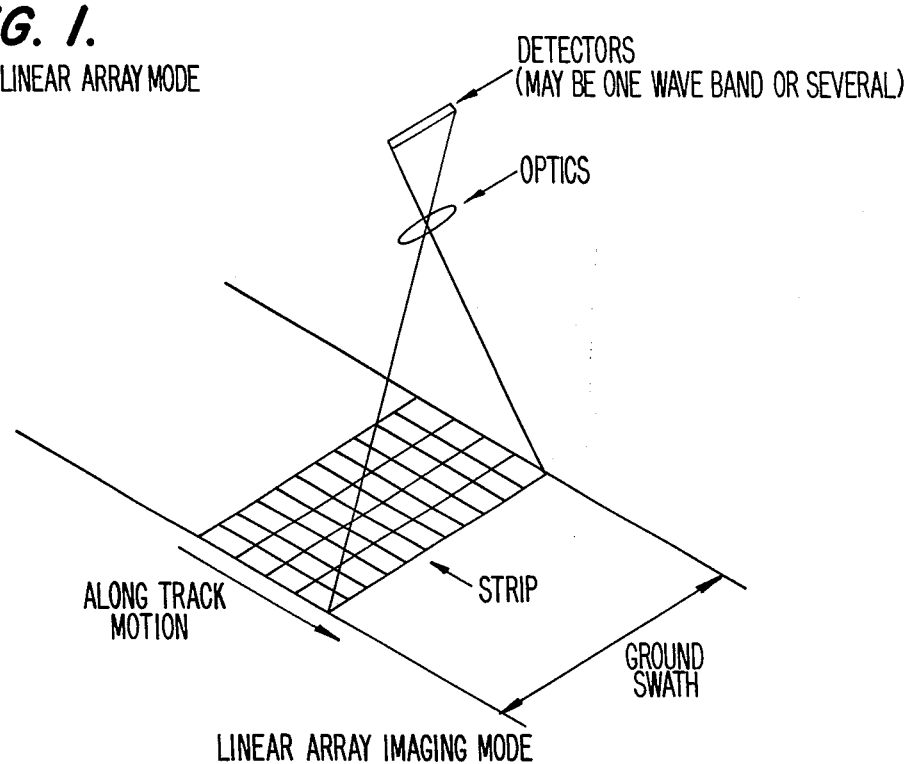
FIG. 1 is an illustration of a conventional linear mode array.
Figure 3A:
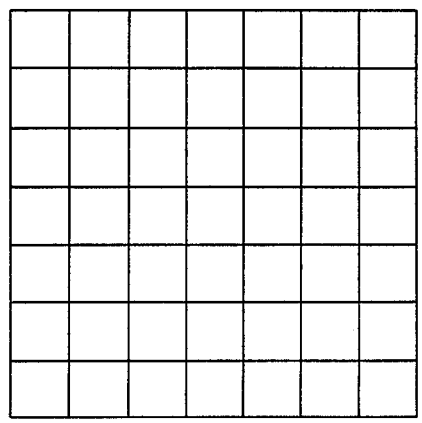
FIG. 3(a) and 3(b) illustrate a comparison of conventional 3(a) and systematic offset 3(b) of solid state two dimensional arrays.
Figure 3B:
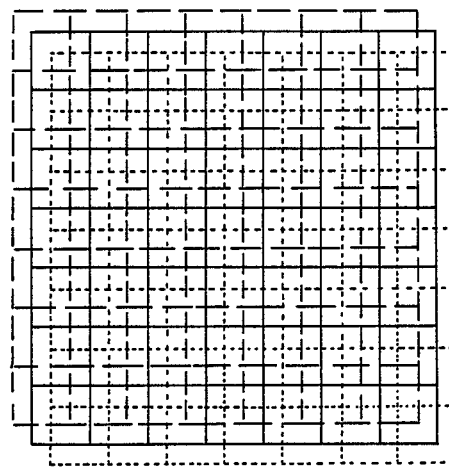

In the case of little or no relative motion between the scene and the sensor and where close up pictures may be desired, the detector arrays would be offset or overlap as shown in FIG. 3b. There the imaging apparatus or sensor may be stationary, and, accordingly, the picture elements have to be offset in two directions in order to create the necessary subpixels for the desired resolution improvement of the present invention. The present invention can also be utilized by offsetting, for example, three electromagnetic wave bands in the same matter as FIG. 2b and utilized with a mechanical scanner to improve the breadth of the image. The mechanical scanner improves the breadth of the image while the offsetting of the different wave length detectors in accordance with this invention improves the resolution of the image. As stated, bands of more than three as shown in FIGS. 1-3 can be utilized or as little as two can be used. Three were taken in the illustration in the Figures for simplicity of representation.

It can be appreciated that the present invention relies on the basic principal that an image taken with two different geometric aspects will improve the resolution as compared to an image taken with a single geometric aspect. By offsetting the picture elements, it is possible to subdivide one picture element in the case of three different bands of different wave length into nine subpixels which improves the resolution of the image that is formed. Theoretically, with a use of three different color bands offset to each other in the manner shown, the improvement of the resolution of the picture should be equal to the square root of 3. However, because the quality of the information that is obtained is depended upon the spectral difference that is present in the scene that is viewed, and is therefor not fully coherent, the actual improvement of the resolution of the image is somewhat less. According to the present example set forth at the end of the specification, the image would be improved considerably in resolution. A scene without reflective or spatial differentiation proportional to the resolution of the sensor will show little or no information gained by the use of the instant invention. On the other hand, objects or arrays which do show sufficient differentiation such as most earth and planet scenes will be recorded with a considerable increase in information content. There is needed a computer program or algorithm to process the signals obtained by the detectors and create values for the subpicture elements in the appropriate image. There are known algorithms which may be modified for doing this. For example, the Environmental Research Institute of Michigan (ERIM) utilizes such a computer program to create subpixels values for the overlapping areas involved in the multispectral scanner data (NASA's LANDSET sensor). This algorithm is commonly known as restoration or deconvolution. It can be adapted to data created by this invention. There is no claim to the formation of such a program in the present invention.

As FIGS. 3(a) illustrate, the present invention can be applied to a two dimension array for a stationary camera image forming apparatus, and it can be utilized with a mechanical scanner to improve the image that is focused on the detector elements with the different wave lengths of electromagnetic energy that may be utilized. Further, the detector elements that may be present in the apparatus are differentially sensitive to 2 or more different wave bands of electromagnetic energy.

It should be appreciated that the invention of the instant system is that the quality of an image can be improved while the size and number of the picture elements and wave bands, all of which determine cost, are not changed. The concept that is used herein to improve the resolution is to offset the picture elements so as to form sub picture or sub pixels elements in each picture element depending on how many different wave bands of electromagnetic energy are involved. As a result, the invention involves the processing of a larger number of bits of information than for the conventional mode. For example with three wave bands 9 subpixels are produced from each basic pixel thus increasing the amount of data to be processed nine fold. However with modern computer capabilities this is considered to be a small price to pay for the increased information content in a remote sensing system of a given size and cost.

A hypothetical example of how the instant apparatus works is presented below. The example assumes that there is color coherence in the wave bands recorded by the apparatus, and that there are no boundaries very close to each other, but that there is a clear boundary line between the two fields in the scene. The example is one of a simple scene to illustrate the present invention. The calculations were carried out by hand whereas in the actual situation they would be carried out by a computer. There is no intention to set limits and boundaries to the instant invention by the inclusion of the example.

EXAMPLE

Figure 4:
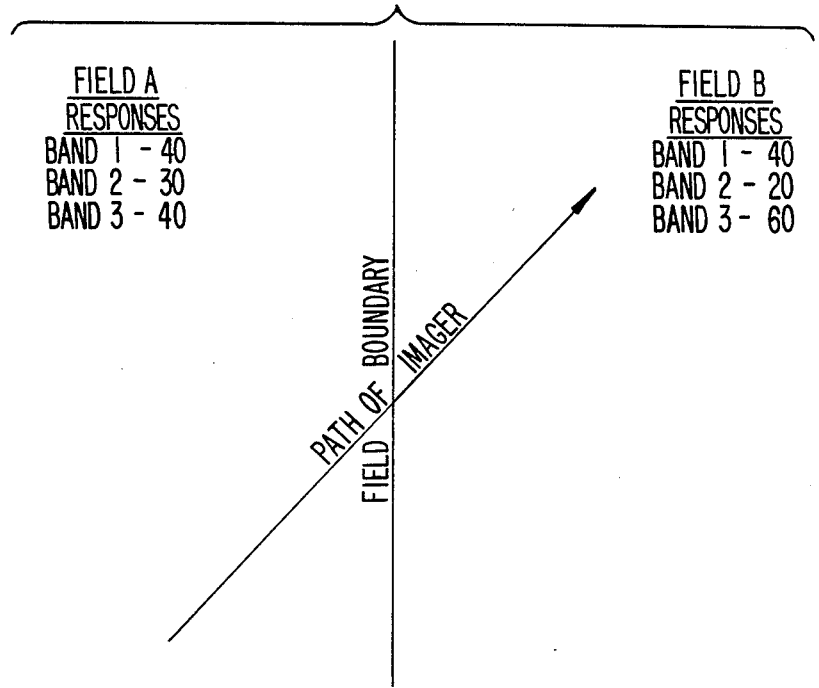
FIG. 4 is an illustration for the Example.

The test area utilized is nothing more than a simple field boundary between a fallow field and growing crops. This boundary is illustrated by FIG. 4 which tabulates the radiometric response for three multispectral wave bands as they might record this area. Note that band 1 response remains the same for fields A and B, band 2 response is lower for B while band 3 is higher for B. To simplify analysis, the sensor path crosses the boundary at 45°, and one of the registered pixels (of Z dimension) is bisected by the boundary as shown by FIG. 5. The offset case involves one of the three multispectral pixels (Z dimension) also being bisected as shown. The detectors will record the values shown for the original pixels. In order to develop values for the subpixels (⅓ Z dimension) the following steps must be taken:

1. Determine value for A and B for each of the three bands. This can be done by looking at adjacent pixels of the same band for a commonality which indicates that two values (A & B) and a boundary are involved. The values for areas A and B are thus determined for each of three bands (1, 2, 3). We can then develop radiance values for:

$A_1$, $B_1$, $A_2$, $B_2$, $A_3$, $B_3$ which in this case are:
40, 40, 30, 20, 40, 60 respectively.

The basis pixels are identified by Roman numerals and the subpixels by Arabic numerals on FIG. 5.

2. Determination of subpixel values. The differences in the physical locations and the radiance values of the basic pixels provide the data necessary to develop radiance values for the subpixels. This is accomplished as follows (see FIG. 5):

a. The Z dimension pixels indicated by the three symbols and Roman numeral designators all have given radiance values based on the scene response and the relationship of the pixel to the boundary.

Where a pixel involves two values due to the boundary, we get a value between the A and B values based on the position of the pixel. Therefore, $$II_1 = \frac{17A_1 + B_1}{18} = 40$$

$$II_2 = \frac{A_3 + B_2}{2} = 25$$

In like manner we obtain the values for all the pixels as follows:

| | | |
|---|---|---|
| $I_1 = 40$ | $I_2 = 30$ | $I_3 = 40$ |
| $II_1 = 40$ | $II_2 = 25$ | $II_3 = 40$ |
| $III_1 = 40$ | $III_2 = 20$ | $III_3 = 44.4$ |
| $IV_1 = 40$ | $IV_2 = 25$ | $IV_3 = 40$ |
| $V_1 = 40$ | $V_2 = 20$ | $V_3 = 44.4$ |
| $VI_1 = 40$ | $VI_2 = 20$ | $VI_3 = 58.9$ | b. We can see that the offset has created nine response differences in each Z dimension pixel or, in effect, ⅓ Z subpixels. These are here numbered 1 through 48 and each is made up of response from the three (1, 2, and 3) bands. As an example let us compile the value for subpixel 13. To do this we must assume that the three bands do in fact correlate and that they have the same common boundary between A and B. Subpixel 13 contains the responses from pixels $II_1$, $II_2$, and $II_3$, and to compute $13_1$ we use the band 1 values for all three pixels. Thus, $$13_1 = \frac{\frac{17A_1 + B_1}{18} + \frac{A_1 + B_1}{2} + A_1}{3} = \frac{44A_1 + 10B_1}{54} =$$

$$\frac{44 \times 40 + 10 \times 40}{54} = 40$$

For $13_2$ and $13_3$ we merely substituted the $A_2 B_2$ or $A_3 B_3$ values in the same basic formula.

$$13_2 = \frac{44 \times 30 + 10 \times 20}{54} = \frac{1520}{54} = 28.15$$

-continued $$13_3 = \frac{44 \times 40 + 10 \times 60}{54} = 43.70$$

Using this same approach we compute the values for each subpixel in each of the three bands.

$$14_{(1,2,3)} = \frac{II_{(1,2,3)} + II_{(1,2,3)} + III_{(1,2,3)}}{3}$$

$$14_1 = 40, 14_2 = 27, 14_3 = 45 \text{ and}$$

$$15_1 = 40, 15_2 = 25, 15_3 = 50 \text{ etc.}$$

Figure 6:
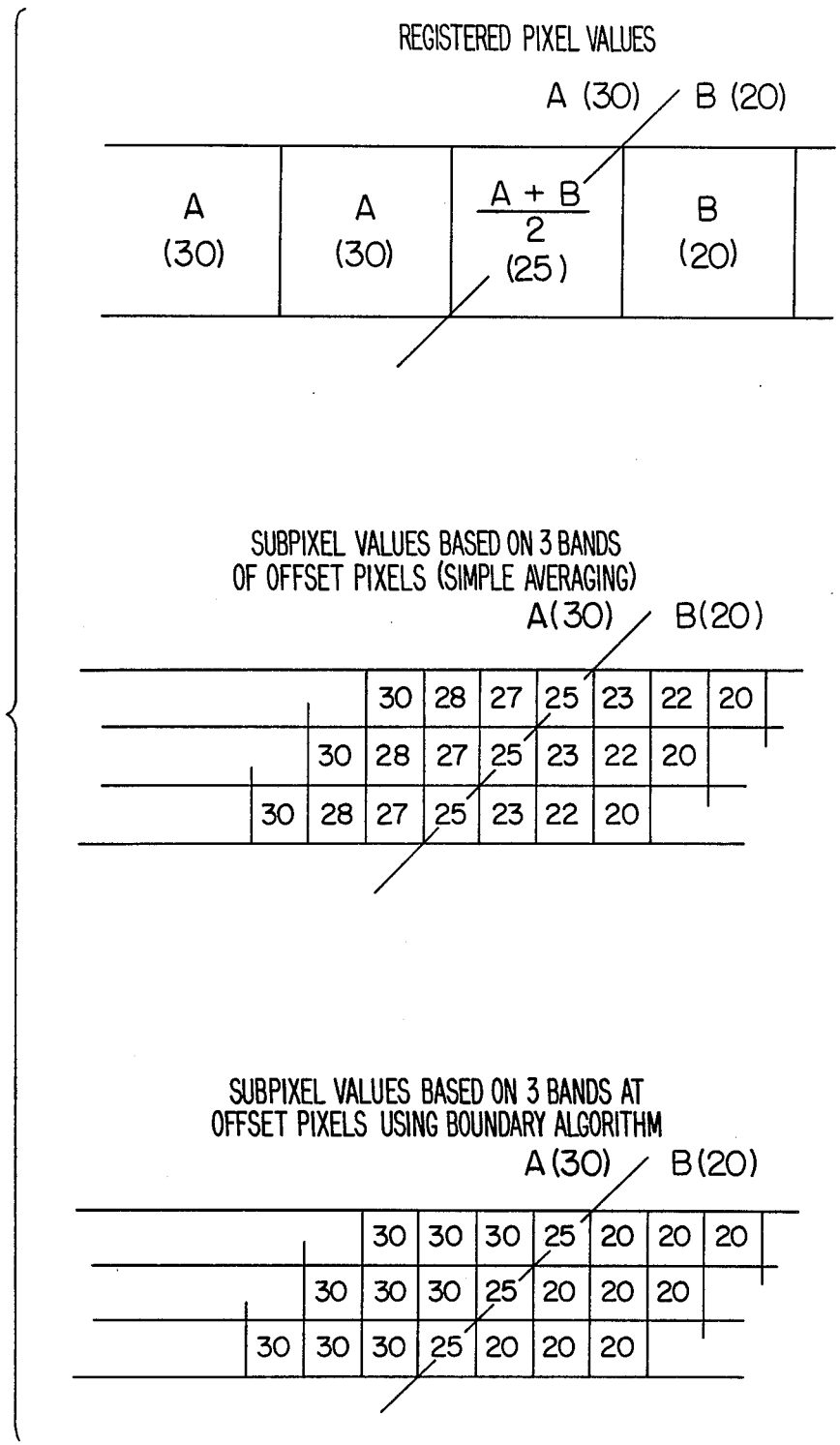
FIG. 6 is an illustration for the Example.
Figure 7:
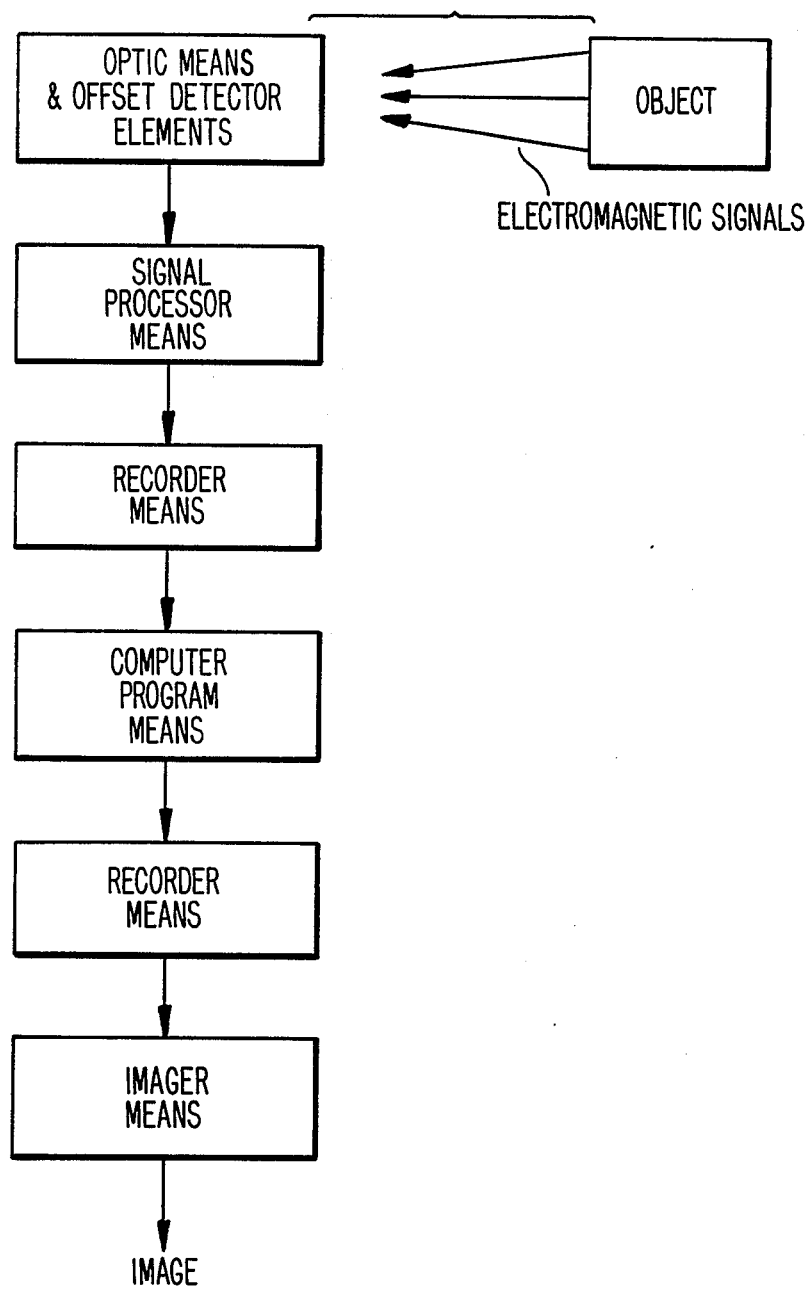
FIG. 7 is a schematic diagram of the typical equipment necessary along with the offset detector elements to form an image. In this configuration, there is little or no relative motion between the object being viewed and the offset detector elements. Other than the offset detector elements, the equipment represented is conventional state-of-the-art articles which perform the functions indicated.
Figure 8:
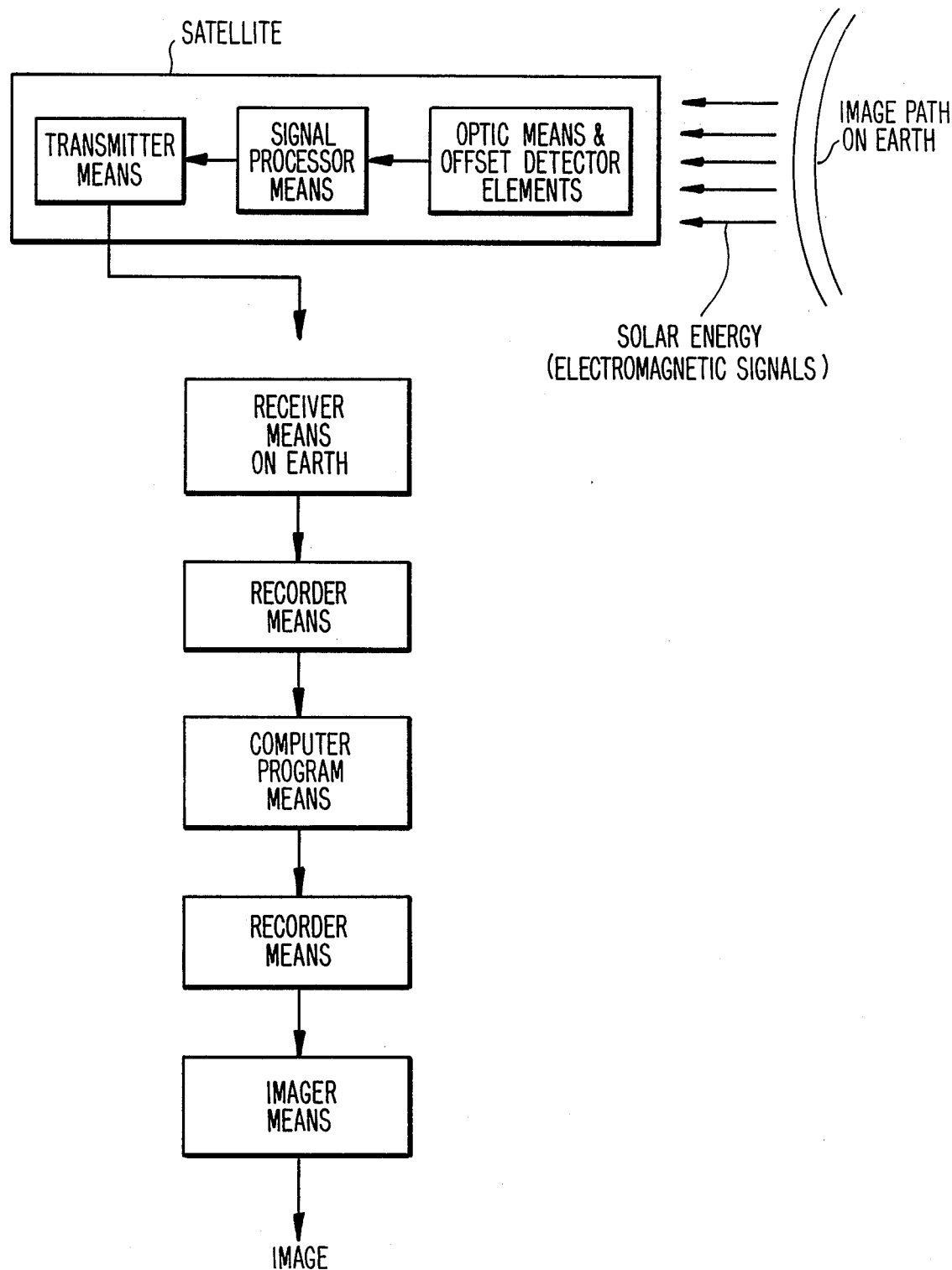
FIG. 8 is a schematic diagram of the typical equipment necessary along with the offset detector elements to form an image. In this configuration, there is relative motion between the object being viewed and the offset detector elements. Other than the offset detector elements, the equipment represented is conventional state-of-the-art articles which perform the functions indicated.

The results are shown on FIG. 6 which compares the registered response to the systematically offset response for waveband 2.

c. If one compares the response between the registered and offset pixels created by simple averaging, the differences are not very great except that the alignment (microgeometry) of the boundary is better displayed in the offset case. However, a further enhancement may be applied based on the logical assumption that we are dealing with a single boundary and that any subpixel radiance values within one third of the difference between the two field responses (for any given band) will be adjusted to the field response itself. Using this adjustment (algorithm) we get the responses illustrated by using a boundary algorithm. Here we can see a very significant improvement in the definition to the boundary and the radiance value on each side of it by using the offset approach.

CONCLUSION

This test is highly simplified and covers only one case by which a boundary between two sizable fields have been defined by conventional and offset multispectral systems. It does, however, illustrate the advantage of using the offset concept with respect to this particular test area. The world is made up of an infinite variety of patterns and responses, and there will be cases, such as areas of high frequency changes, where the elements which create the radiometric patterns are smaller than the pixels. There the improvement by the offset concept may be negligible. However, this test does indicate that, in general, resolution, microgeometry and radiometric fidelity will all be improved by use of this concept. The variety of algorithms that can be applied to the data produced by this system is very large, and the effectiveness of such algorithms will also vary according to the characteristics of the area being imaged. Further testing over a wide variety of objects and areas as expected to develop optimum algorithms for general use.

I claim:
1. A method for improving the resolution of images of objects taken by a solid state apparatus using at least two sets of solid state detector elements with each set having sensing element areas sensitive to a different wave band of signals of electromagnetic energy, comprising:
 (a) systematically offsetting said sets of solid state detector elements each set being sensitive to different wave bands of signals of electromagnetic energy from the other so as to form subpicture elements sensitive to the different wave bands; and
 (b) resolving into an image by computer program means and recording means the signals of electro- magnetic energy received by the subpicture elements.

2. The method of claim 1 wherein there are at least three different sets of detector elements sensitive to said different wave bands of electromagnetic energy.

3. The method of claim 2 wherein the three different wave bands are visible wave bands.

4. The method of claim 3 wherein the different wave bands are the colors red, green, and blue, and in which the different sets of detector elements offset each other a third of the sensing element areas of each other so as to form 9 separate subpicture elements from each detector element of each set of detector elements.

5. The method of claim 1 wherein the sets of detector elements in said solid state apparatus offset each other in one direction only, and the apparatus forms images while in a fixed position on a vehicle selected from a space vehicle and an airborne vehicle wherein said vehicle is moving in a direction substantially perpendicular to the direction of the offsetting of said detector elements.

6. The method of claim 1 wherein the sets of detector elements offset each other in two directions perpendicular to each other and substantially in the same plane.

7. The method of claim 1 wherein it is applied to the forming of images by an available system of a developed satellite imaging apparatus whereby the formation of the subpicture elements is achieved in one dimension by the sequential sampling of signals of electromagnetic energy received by the sets of detector elements as the satellite moves across the objects.

8. The method of claim 6 wherein there is substantially no relative motion between said solid state apparatus and said objects.

9. A solid state multispectral imaging apparatus for forming images of objects using sets of solid state analogous detector elements, each set of detector elements made up of a plurality of sensing area elements wherein each set of detector elements is sensitive to a different wave band of signals of electromagnetic energy, comprising:

(a) at least two sets of analogous detector elements with each detector element in each set of detector elements being offset from the analogous detector elements so as to form subpicture elements which receive the signals of electromagnetic energy;

(b) computer program means for processing into data the signals of electromagnetic energy received by said subpicture elements; and (c) recording means for transforming said data into an image.

10. The imaging apparatus of claim 9 wherein said apparatus is set in a fixed position on a vehicle selected from a space vehicle and an airborne vehicle, and in said apparatus said sets of different detector elements offset each other in one direction only and the apparatus forms images while the vehicle moves in a direction substantially perpendicular to the direction of the offsetting of the sets of detector elements.

11. The imaging apparatus of claim 9 wherein said apparatus is set in a fixed position in a vehicle selected from an airborne vehicle and a spacecraft vehicle.

12. The imaging apparatus of claim 9 wherein said apparatus is mounted on a vehicle selected from a space vehicle and an airborne vehicle and in which said sets of detector elements offset each other in both cardinal directions of the image plane.

13. The imaging apparatus of claim 9 wherein said sets of detector elements offset each other in both cardinal directions of the image phase and there is substantially no relative motion between said solid state apparatus and said objects.

* * * * *